United States Patent [19]

Leibfred

[11] Patent Number: 4,795,647

[45] Date of Patent: Jan. 3, 1989

[54] CONTINUOUS PRODUCTION OF SHELF-STABLE MULTI-TEXTURED SHREDDED CEREAL BISCUITS HAVING A PASTE FILLING

[75] Inventor: Kevin J. Leibfred, Oakland, N.J.

[73] Assignee: Nabisco Brands, Inc., Parsippany, N.J.

[21] Appl. No.: 40,479

[22] Filed: Apr. 16, 1987

Related U.S. Application Data

[63] Continuation of Ser. No. 695,059, Jan. 25, 1985.

[51] Int. Cl.$^4$ ............................................. A21D 13/00
[52] U.S. Cl. ...................................... 426/94; 426/274; 426/283; 426/452; 426/560; 426/620
[58] Field of Search ................. 426/94, 283, 560, 620, 426/452, 274

[56] References Cited

U.S. PATENT DOCUMENTS

| | | | |
|---|---|---|---|
| 502,376 | 8/1893 | Perky et al. | 426/103 |
| 993,922 | 5/1911 | Wallace | 426/620 |
| 2,008,024 | 7/1935 | Loose | 426/94 |
| 2,013,003 | 9/1935 | Loose | 426/94 |
| 2,693,419 | 11/1954 | Gager | 426/103 |
| 4,004,035 | 1/1977 | Hirzel et al. | 426/275 |

FOREIGN PATENT DOCUMENTS

| | | |
|---|---|---|
| 674046 | 11/1963 | Canada. |
| 12455 | of 1911 | United Kingdom. |
| 1167909 | 10/1969 | United Kingdom. |

*Primary Examiner*—Jeanette Hunter
*Attorney, Agent, or Firm*—Richard Kornutik

[57] ABSTRACT

The invention provides a shelf-stable paste-filled shredded cereal biscuits having an extended shelf-stable plurality of textures. A first plurality of net-like sheets of cereal dough are continuously laminated, followed by continuous depositing of at least one extrudate rope filling upon the first plurality of net-like sheets. A second plurality of net-like sheets is continuously laminated upon the at least one extrudate rope to obtain a filled laminate. Each of the net-like sheets has a plurality of generally parallel longitudinal strands and a plurality of crosshatchings which are generally perpendicular to the longitudinal strands. The filled laminate is cut to enrobe the filling and the product is baked. The number of crosshatchings of the net-like sheets adjacent to the filling is greater than the number of crosshatchings of the net-like sheets which are further removed from the filling.

24 Claims, No Drawings

CONTINUOUS PRODUCTION OF SHELF-STABLE MULTI-TEXTURED SHREDDED CEREAL BISCUITS HAVING A PASTE FILLING

This is a continuation of application Ser. No. 695,059, filed Jan. 25, 1985.

FIELD OF THE INVENTION

This invention relates to the continuous production of paste-filled shredded cereal biscuits having a shelf stable plurality of textures. This invention also relates to paste-filled ready-to-eat shredded cereal biscuits having a plurality of shelf-stable textures.

BACKGROUND OF THE INVENTION

Shredding systems used in the production of shredded wheat are disclosed in U.S. Pat. Nos. 502,378; 2,008,024; 2,013,003, 2,693,419; 4,004,035; and Canadian Pat. No. 674,046. A conventional shredding mill comprises a pair of closely spaced rolls or rollers that rotate in opposite directions, with at least one of the rolls having circumferential grooves. Upon passing between the rolls, the wheat is deformed into long individual strings or shreds. The circumferentially grooved roll can also be grooved transversely to the circumferential grooves for the production of net-like sheets. A conventional 5 inch diameter roller for producing net-like sheets has 60 transverse grooves equally spaced about the circumference which produce crosshatchings in the netted product. When the rollers are held to roll in mutual contact, the shreds or filaments will be fairly separate from each other, though more or less contacting, but when the rollers are sprung slightly apart, under pressure, the adjacent filaments may be united to each other by very thin translucent, almost transparent, webs or fins between them.

The shredding mills are typically arranged in a linear series along a common conveyor, with the shreds running longitudinally or in parallel with the direction of movement of the conveyor. The sheets or layers of filaments are deposited on the conveyor in superposition, with their filaments running in the same direction. A typical biscuit, for example, may contain up to 21 individual layers of shreds. Upon obtaining the requisite thickness, the multiple layer web can be cut transversely and longitudinally into multiple lines of biscuits in known manner.

The production of shredded cereal products having a fruit paste filling is taught in U.S. Pat. Nos. 2,693,419 and in 4,004,035. According to U.S. Pat. No. 2,693,419 the shred form is superior to other cereal forms, such as flakes, puffs, and the like in the it does not become soft and soggy when containing relatively high percentages of moisture. Dried fruit is enclosed within cereal shreds to provide a product wherein the cereal and dried fruit are essentially integral. After the fruit has been enclosed within the cereal shreds, it is taught, the cereal may be processed at elevated temperatures without any substantial adverse affect on the texture and flavor of the fruit.

The shredded product is prepared by depositing layers of moist, cooked shreds on top of each other in the process of U.S. Pat. No. 2,693,419. Usually after about half of the shred layers have been laid down, the fruit is deposited on the shreds and the remainder of the shred layers is laid down on top of the fruit. The shreds, it are taught, may be produced by means of a shredding machine comprised of a series of shredding heads, each of which consist of a pair of rolls revolving toward each other. The cereal elements are forced between the rolls and into the grooves contained therein to drop in a continuous flow of shreds onto a conveyor belt situated beneath the shredding machine.

In a particular embodiment, raisins are deposited over the surface of the shred bed in a prearranged pattern after seven shred layers have been deposited. The pattern is such that upon cutting the shreds to form biscuits, the raisins will be marginally spaced within the biscuits and otherwise centered therein. The shreds are cut into biscuits using blunt edged knives after an equal number of shred layers are deposited on top of the raisins.

The raisins, it is taught, may be replaced by fruits in the form of a macerated paste. The paste is preferably incorporated within the shreds in a mass or compact strip to minimize the surface that is exposed to the heat treatment of the biscuits.

However, in the production of shredded filled products from layers of individual shreds, pastes which are deposited between the two innermost layers tend to migrate towards the outer layers during baking thereby diminishing a desirable textural dichotomy of a crispy outside and a chewy interior. Loss of textural dichotomy and even exposure of the paste upon the surface is particularly acute in spoon size or bite size biscuits, which typically have a maximum dimension of about one inch.

Furthermore, continuous mass production of shredded biscuits typically involve production rates of up to about 150 to 200 feet of shreds per minute, or more. The continuous depositing of a strand or rope of paste into a bed of shred layers tends to at least periodically separate the shreds of the layer upon which it is deposited. This causes penetration of the paste into other layers or the consequent loss of dual texture. In addition, it causes the paste to be deposited in a non-linear pattern which adversely affects the cutting operation where the cuts are desirably made in the intervals between the deposits of fruit paste.

U.S. Pat. No. 4,004,035 teaches the production of a shredded biscuit having a lapped zig-zag configuration in which the shreds are disposed on an angle relative to the sides and ends of the biscuits and the shreds of individual layers are disposed on opposite or crossing angles. The biscuit, it is taught, is more rugged than a conventional biscuit which is produced using shredding mills which are arranged in a linear series across a common conveyor, with the shreds running longitudinally or in parallel with the direction of movement of the conveyor.

In the process of U.S. Pat. No. 4,004,035, the addition of a second lapping device allows the introduction of a flavorful filling between the laps, resulting in a filled shredded biscuit having a lapped zig-zag configuration. Each lapping device is fed by one or more conventional shredding mills comprising a pair of closely spaced rolls wherein preferably one of the rolls has a smooth circumference and the other has a grooved circumference. According to U.S. Pat. No. 4,004,035, use of the lapping devices reduces the number of conventional shredding mills needed to produce biscuits having a given number of shred layers and provides greater flexibility in obtaining biscuits of various sizes.

It has been found that in the production of shredded filled products having a total of about 10 layers using linearly arranged shredding mills having a 5 inch diameter roller with 20 circumferential grooves per inch and 60 crosshatching grooves, the net-like shred layers possess sufficient strength so as to permit continuous depositing of a rope of paste in a straight line without substantial penetration through the layer upon which it is deposited. However, the baked product has a uniformly dense texture upon biting through it.

The present invention provides a continuous process for the production of multitextured paste-filled shredded wheat biscuits using shredding mills which are arranged in the conventional linear fashion wherein each shred layer is produced from a separate pair of shredding rollers. The density of the biscuit portion of the product is varied so as to produce a multitextured biscuit. The variation enhances the textural dichotomy of a crisp biscuit and a soft and chewy center filling. The multiple textures are shelf stable for extended periods of time.

SUMMARY OF THE INVENTION

The present invention provides a process for the continuous production of a shelf-stable paste-filled shredded cereal biscuit having a plurality of textures. A first plurality of shredded cereal dough layers are continuously laminated, followed by continuous depositing of at least one extrudate rope filling upon the first plurality of shredded layers. A second plurality of shredded cereal dough layers is continuously laminated upon the at least one extrudate rope to obtain a filled laminate. Each of the layers has a plurality of generally parallel longitudinal strands and a plurality of crosshatchings which are generally perpendicular to the longitudinal strands. The crosshatchings and the longitudinal strands form an integral net-like sheet. The longitudinal strands of each layer and the extrudate ropes are generally parallel. The filled laminate is cut to enrobe the filling and the product is baked.

The number of crosshatchings of the integral net-like sheets adjacent to the filling is greater than the number of crosshatchings of the net-like sheets which are further removed from the filling. The use of fewer crosshatchings provides a region of light texture which enhances the impression of a soft or chewy filling. The use of a greater number of crosshatchings in the net-like sheets which are adjacent to the filling: (1) prevents substantial penetration of the filling through the adjacent sheets during deposition of the extrudate rope and during baking, (2) enhances the chewiness of the filling, and (3) reduces lateral movement of the longitudinal strands so as to facilitate consistent deposition of the filling rope in an at least substantially straight line.

The region of light texture is preferably limited to the interior layers of the biscuit to: (1) enhance the appearance of the biscuit, (2) enhance an initial impression of crispness, and (3) provide a more stable bed for the depositing of additional net-like sheets.

A sugar is preferably deposited substantially uniformly across the first plurality of shredded cereal dough layers prior to deposition of the at least one extrudate rope filling to inhibit moisture migration from the baked filling to the net-like sheets.

DETAILED DESCRIPTION OF THE INVENTION

The ready-to-eat paste-filled shredded cereal biscuits of the present invention have a shelf-stable plurality of textures. The paste filling is enrobed in a plurality of shredded cereal layers which provide a region of dense texture and enhance the chewiness of the biscuit. A plurality of shredded cereal layers which provide a region of light texture enrobe the region of dense texture and enhance textural dichotomy of a crisp biscuit with a soft and chewy filling. A plurality of shredded cereal layers which provide a region of dense texture enrobe the layers which provide a region of light texture to enhance an initial impression of crispness, to provide a multiple texture within the shredded layer portion of the filled biscuit, and to enhance the appearance of the biscuit. A sugar is preferably deposited between the filling and the adjacent layers which provide a region of dense texture so as to inhibit moisture migration from the filling to the shredded cereal layers.

As used herein the term "enrobed" does not require a complete covering, although such is preferred. The covering should be at least substantially complete along each cut edge of the biscuit and complete across the major dimensions of the biscuit. Accordingly, a filling is considered to be enrobed by a plurality of baked shredded dough layers in biscuits where filling is exposed along portions of one or more cut edges.

Each of the layers has a plurality of generally parallel longitudinal strands and a plurality of crosshatchings generally perpendicular to the longitudinal strands. The crosshatchings and the longitudinal strands form an integral net-like sheet. The texture of each region is controlled by the number of crosshatchings in each layer forming the net-like sheets. The net-like sheets are preferably unwebbed or webless, i.e. the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture.

In preparing the shredded filled biscuits of the present invention, the cereal grains are cooked and tempered in known manner to obtain particles which are suitable for shredding on shredding rolls. Suitable moisture contents of the cereal grains for shredding range from about 28% to about 49%, more typically from about 39% to about 43% by weight, based upon the weight of the cereal grains. The cooked and tempered cereal grains are transferred, suitably by means of belt conveyors to a hopper which feeds a screw conveyor. The latter transfers the cereal grain to a series of shredding rolls or mills via flow tubes or hoppers.

The shredding mills comprise a pair of rolls that rotate in opposite directions. One of the rolls has circumferential grooves and crosshatching grooves which are transverse to the circumferential grooves for the production of an integral net-like sheet. The spacing between the rolls is preferably controlled so as to avoid the production of webbing. Upon passing between the roll, the cereal grain is deformed into the circumferential grooves and the crosshatching grooves. Each pair of rolls produces a cereal dough layer having a plurality of generally parallel longitudinal strands and a plurality of crosshatchings generally perpendicular to the strands. The longitudinal strands are produced by the circumferential grooves and run in parallel with the direction of movement of an underlying conveyor. The crosshatchings of the dough layer are produced by the crosshatching grooves and run generally perpendicular to the direction of movement of the conveyor.

The shredding mills are arranged in a linear series along the common underlying conveyor. Each of the shredded dough layers or sheets are deposited on the conveyor in super-position, with their longitudinal strands running in the same direction.

A first plurality of shredded cereal dough layers are continuously laminated, then the sugar is deposited substantially uniformly across the first plurality of shredded cereal dough layers. At least one extrudate rope filling is then continuously deposited upon the first plurality of shredded dough layers. Each extrudate is deposited generally parallel to, or in the same direction as, the longitudinal strands. Additional sugar may be deposited at this point for contact with the upper surface of each extrudate rope filling. A second plurality of shredded dough layers is then continuously laminated upon the one or more extrudate rope fillings in superimposed position to the first plurality of dough layers to obtain a filled laminate.

The number of crosshatchings of the net-like sheets adjacent to the extrudate rope filling or fillings should be sufficiently high so as to prevent substantial penetration of the filling through the net-like sheets during baking and to provide a region of dense texture surrounding the filling which enhances the chewiness of the filling. The adjacent net-like sheets providing the region of dense texture may be one or more sheets which are deposited prior to and subsequent to deposition of the at least one extrudate rope filling. Preferably two or more of such adjacent net-like sheets are deposited prior to depositing of the extrudate rope so as to provide a more stable bed upon which the extrudate rope is deposited thereby reducing waviness in the deposited rope filling.

The first and last shredded cereal dough layers to be deposited or laminated should also have a sufficient number of crosshatchings so as to provide a region of dense texture in the biscuit. The first layer which is laid down upon the conveyor belt thereby provides a more stable bed for the depositing of subsequent shred layers. Additionally, the outside appearance of the product is enhanced by the presence of crosshatchings as is the initial impression of crispness upon eating. The number of crosshatchings in the layers which provide a dense texture adjacent to the filling and in the outermost portion of the filling may be the same or different. For a 5 inch diameter shredding roll, the number of crosshatchings are suitably about 45 or more, equally spaced about the roll. Five inch diameter rolls may typically have: (1) about 18 to 22 circumferential grooves per inch, having a depth of about 0.018 to 0.024 inches and a width of from about 0.025 to 0.033 inches, and (2) up to about 120 equally spaced crosshatching grooves having a width of up to about 0.040 inches, and a depth of 0.002 to 0.008 inches less than the depth of the circumferential grooves. Larger or smaller diameter rolls may also be used with about the same frequency and dimensions of grooves as the five inch diameter rolls.

The dough layers which are deposited between the layers providing a dense texture should have a reduced number of crosshatchings so as to provide a region of light texture in the interior of the biscuit. Typically, each of the net-like sheets which provide a region of light texture have a number of crosshatchings which is less than about 50% of the number of crosshatchings of the net-like sheets which are adjacent to the filling for providing the region of dense texture. The number of crosshatchings in each layer which provides the region of light texture may be the same or different.

To provide a textural dichotomy which is readily discernible by the consumer, at least 30% of the total number of net-like sheets should provide one or more regions of light texture. Generally, the total number of net-like sheets may range from about six to about 21, with the larger number of sheets being reserved for the larger sized biscuits. For spoon-sized biscuits a suitable number of net-like sheets ranges from about 6 to about twelve.

The number of shredded cereal dough layers or net-like sheets for providing a dense texture in the first plurality of dough layers may be the same or different from the number providing a dense texture in the second plurality of dough layers. Likewise, the number of layers for providing a region of light texture may be the same or different in the first plurality than in the second plurality of dough layers. It is generally preferably to provide the same total number of shredded dough layers in the first plurality as in the second plurality so as to provide a pleasing symmetrical appearance.

Depositing of the sugar substantially uniformly across the first plurality of shredded dough layers may be accomplished by any suitable means placed between the point of application of the at least one extrudate rope filling and the pair of shredding rolls which produces the shredded dough layer upon which the extrudate rope or ropes are deposited.

The sugar should be a humectant sugar for inhibiting moisture migration from the baked filling to the net-like sheets of the biscuit. Exemplary of humectant sugars are fructose, aqueous solutions thereof, liquid brown sugar, corn syrup, and granulated brown sugar. Granulated humectant sugars are preferred because of the difficulties involved in spraying a sugar solution within a confined area at relatively low mass flow rates. The preferred granulated sugar is granulated brown sugar.

The granulated sugar is suitably applied by means of a gravimetric topping device comprising a hopper which feeds a rotating drum for dispersing the material upon the dough layer below it. The sugar is suitably deposited at a rate which provides from about 4% to about 10% by weight of sugar, based upon the total weight of the filled biscuit.

The filling is deposited by means of an apparatus placed between adjacent pairs of shredding rolls. The filling is suitably applied by extrusion through a nozzle so as to form an extrudate rope which is continuously deposited upon the first plurality of dough layers. The apparatus should have a means for controlling and directing the flow of the filling so as to provide a straight and uniform extrudate upon a substrate which moves at substantially the same linear rate as the extrudate.

The number of extrudate ropes which are deposited generally ranges from about one to five or more, depending upon the width of the shredding roll and the desired biscuit size. A conventional 5 inch diameter shredding roll typically has a width of between about 5 to about 6 inches. Typically, about 5 spoon size or bite size biscuits may be produced within this width thereby calling for the deposition of five extrudate ropes.

Each of the extrudate ropes may be supplied by separate apparatus. However, it is preferably to utilize a single apparatus for depositing mutliple rows of paste such as disclosed in commonly assigned, U.S. patent application Ser. No. 659,060, in the names of Ralph D. Lee and Nicholas R. Polifroni for PASTE SPREADER APPARATUS FOR SHREDDED WHEAT, filed concurrently herewith. The disclosure of the application is herein incorporated by reference in its entirety. Paste is supplied by means of a pump to a paste conduit portion which is connected to a paste outlet portion. The oulet portion includes a plurality of outlet orifices which each comprise a nozzle member. The mass flow and direction of flow of the paste from each nozzle is individually controllable.

The mass flow rate of the extrudate rope filling from each nozzle should be sufficient to provide typically at least about 15% by weight filling in the biscuit, based upon the weight of the final product.

The filled laminate is cut transversely and longitudinally to the direction of flow of the product into multiple lines of filled biscuit performs using known cutting devices. The filled laminate is suitably first cut transversely and then longitudinally with respect to the longitudinal strands of each shredded dough layer. In producing rectangularly shaped biscuits, it is preferably to cut the biscuit so that its longest dimension is transverse to the longitudinal strands and the extrudate rope. This provides greater tolerance for cutting between the extrudate rope fillings without cutting through the extrudate rope. The longitudinal cuts are suitably made about midpoint between adjacent extrudates.

The cutting can be completely through the laminate to form the individual biscuit shapes prior to baking. However, cutting partially through the filled laminate to form biscuit shapes, followed by baking and separating the baked partially cut laminate into individual biscuits in known manner is preferred. This procedure provides easier control of the orientation of a cut product as it passes through the oven.

The cutting edges of the transverse and longitudinal cutters should preferably to blunt so as to form an at least substantially integral seam along each edge of the biscuit preform. The cutting should be such so as to at least substantially prevent the appearance of the filling in the baked, final product.

The fillings used in the filled shredded biscuits of the present invention may be a fruit paste filling, a meat filling, a cheese filling, or the like which is not adversely affected by the baking of the biscuit portion. Meat fillings and cheese fillings are intended for products to be eaten as a snack whereas fruit paste fillings are intended for read-to-eat breakfast cereals or as snacks. Exemplary of fruit paste fillings which may be used are raisin paste fillings, strawberry, apple, apricot, banana, fig, peach, pear, prune, and mixtures thereof. They may include seasonings such as cinnamon or the like. The fillings may contain artificial and/or natural flavorings.

The filling should be formulated to provide a microbially shelf stable product having a water activity of less than about 0.7. Fillings having a higher water activity may be used with a suitable preservative, such as sodium benzoate. Pastes having a water activity of less than about 0.6 prior to baking are preferred so as to assure the attainment of a microbially safe baked product and to inhibit moisture migration to the baked dough layers.

The filling should provide an impression of moistness and be soft and chewy in the baked product under proper packaging and storage conditions. Fruit paste fillings comprising dehydrated fruit and glycerin or other edible humectant polyols and/or sugars may be used. Glycerin levels ranging from about 5% to about 25%, preferably from about 8% to about 12% by weight, based upon the total weight of the filling have been found to provide a desirable moist, soft or chewy texture in the baked product without adversely affecting taste. Suitable fruit paste fillings typically have a water content of at least about 12% by weight of the extrudate rope filling, as determined by Karl-Fischner analysis.

The cereal grains which are used in preparing the shredded cereal dough layers may be wheat, oats, rice, corn, barley, rye, combinations thereof, and the like.

The cut, filled laminate is dried, baked and toasted in conventional equipment. Suitable ovens for drying, baking and toasting the cut filled laminate include Proctor & Schwartz, Werner-Lehara, Wolverine and spooner ovens containing forced air and gas fired burners and a conveyor.

Temperature profiles used in the oven for drying, baking and toasting of the biscuit preforms are generally within the range of about 200° F. to about 600° F. The total time for drying, baking and toasting should be such so as to avoid browning. It depends upon the number of shred layers, the size of the shredded product, the filling, and the type of oven. The total time for drying, baking and toasting typically ranges from about 5 minutes to about 10 minutes.

The final product suitably has an average moisture content of about 6% to about 12%, more preferably from about 7% to about 8% by weight, based upon the weight of the final product, as determined by a Karl-Fischer moisture analysis. The water activity of the final product should be less than about 0.7, preferably less than about 0.6 when properly packaged. With proper packaging, the filling and the shredded cereal portions of the product reach equilibrium with respect to water activities within about two weeks.

The color of the final baked product should be a substantially uniform off-white to light golden tan color. The baked product can be topped with salt or other flavoring or spray oil by top and/or bottom spraying in conventional manner.

The cereal portion of the filled biscuit may contain one or more additives at the usual levels of concentration. Exemplary thereof is a sugar such as sucrose, salt, malt, flavoring, food colorant, emulsifier such as Myvatex ® (a blend of distilled monoglycerides manufactured by Eastman Kodak), vitamins and/or minerals.

The present invention is further illustrated in the following examples. All percentages, parts, and proportions are by weight and all temperatures are in °F. unless otherwise indicated:

EXAMPLE 1

Cooked, tempered wheat berries, fortified with vitamins and minerals and having a moisture content of about 43% by weight are shredded in eight shredding mills arranged in a linear series along a common conveyor. Each shredding mill comprises a pair of counter-rotating 5 inch diameter rolls held in mutual contact for the production of net-like sheets. One of the rolls of each pair contains circumferential grooves and crosshatching grooves which are to the circumferential grooves. The number of circumferential grooves are about 20 per inch, equally spaced along an about 5¼ inch portion of the width of the roller. Each groove is about 1/40 of an inch wide. The crosshatching grooves are about 1/30 of an inch wide and are equally spaced about the circumference of the roller. The depths of the circumferential grooves and crosshatching grooves are 0.020 inches and 0.018 inches, respectively. On one set of rollers the number of equally spaced crosshatchings is 20 whereas on the other set the number of crosshatchings is 60. The linear arrangement of the shredding rollers or rolls is:

DDLDSFDLLD where D represents a pair of rollers with a 60 crosshatching roller, L represents a pair of rollers with a 20 crosshatching roller, S indicates sugar deposition, and F represents filler deposition. The order of lamination, or depositing is from left to right.

The sugar which is deposited is granulated brown sugar. It is dispersed substantially uniformly across the top of the approximately 5¼ inch wide fourth shredded dough layer by means of a gravimetric feeder having a rotating perforated drum which spans the width of the dough layer. The granulated brown sugar is supplied to the drum by means of a hopper. The speed of rotation of the drum is adjusted to deposit the sugar at a mass flow rate which provides a sugar content in the baked biscuit of about 5% by weight, based upon the weight of the filled biscuit.

The filler paste is ground and then pumped, by means of a positive displacement pump to a paste spreader which divides the paste into five extrudate ropes, of about ¼ inch diameter. The ropes flow from nozzles at substantially the same mass flow rate onto the underlying laminated shredded dough layers in a substantially straight line. The laminate is moving at a rate of about 150 feet per minute. The mass flow rate and direction of flow is adjustable for each extrudate rope. The flows are adjusted to provide a filling content in the filled biscuit of about 22% by weight, based upon the total weight of the filled biscuit. The five extrudate ropes are deposited upon the underlying superimposed laminates in a direction generally parallel to the strands formed by the circumferential grooves. The deposited extrudate ropes are spaced about one inch apart.

The filling is prepared by a process comprising admixing macerated raisins with glycerin to obtain a smooth paste having a glycerin content of about 10% by weight and a water activity of about 0.55.

The filled laminate comprising the eight shredded dough layers, the sugar, and the five extrudate ropes is first cut transversely to the ropes at about ¾ inch intervals and then longitudinally at about 15/16 inch intervals. Blunt-edged cutters are used to seam the layers together to form rectangularly shaped biscuit preforms of about 15/16 of an inch by about ¾ of an inch. The cutting is such so as to approximately center each extrudate rope between a 15/16 inch interval. The filled biscuit preforms are dried, baked, and toasted in a gas-fired zone oven for about 7 minutes at temperatures ranging from inlet to outlet within the range of about 200° F. to about 600° F., and separated into individual filled biscuits to obtain a product having a water activity of about 0.4 and an average moisture content of about 7.2% by weight, based upon the total weight of the biscuit, as determined by Karl-Fischer moisture analyses.

The filled shredded biscuits are properly packed and permitted to equilibrate for about two weeks. The biscuits exhibit a pleasant appearance. Upon biting through the biscuits, they provide a crisp initial texture, followed by a light texture which gradually turns to a soft and chewy texture.

EXAMPLE 2

Filled shredded biscuits are produced as in Example 1 except the linear arrangement of the shredding rolls is:

DDLLDSFDLLDD where D, L, S, and F are defined as above.

EXAMPLE 3

Filled shredded biscuits are produced as in Example 1 except an apple paste filling is used instead of the raisin paste filling and its flow is adjusted to provide a filling content in the filled biscuit of about 28% by weight, based upon the total weight of the filled biscuit. The apple paste filling comprises high fructose corn syrup, sugar, glycerin, apples, modified food starch, apple juice, natural flavor, malic acid, sodium alginate, pectin, spices, and sodium benzoate. The water activity of the filling is about 0.73 and its water content is about 23% by weight as determined by Karl-Fischer moisture analysis. The filled biscuit preforms are dried, baked and toasted to obtain a product having a water activity of about 0.6 and moisture content of about 10% by weight, based upon the total weight of the biscuit, as determined by Karl-Fisher moisture analyses.

The filled shredded biscuits are properly packaged and permitted to equilibrate for about two weeks. The biscuits exhibit a pleasant appearance. Upon biting through the biscuits, they provide a crisp initial texture, followed by a light texture which gradually turns to a soft and chewy texture.

EXAMPLE 4

Filled shredded biscuits are produced as in Example 1 except a strawberry paste filling is used instead of the raisin paste filling. The strawberry paste filling comprises glycerin, strawberries, high fructose corn syrup, sugar, modified food starch, strawberry juice, natural flavor, pectin, malic acid, sodium alginate, and sodium benzoate. The water activity of the filling is about 0.66 and its water content is about 22% by weight, as determined by Karl-Fischer moisture analysis. The filled biscuit preforms are dried, baked and toasted to obtain a product having a water activity of about 0.55 and an average moisture content of about 8% by weight based upon the total weight of the biscuit, as determined by Karl-Fischer moisture analyses.

The filled shredded biscuits are properly packed and permitted to equilibrate for about two weeks. The biscuits exhibit a pleasant appearance. Upon biting through the biscuits, they provide a crisp initial texture, followed by a light texture which gradually turns to a soft and chewy texture.

What is claimed is:

1. A ready-to-eat paste-filled shredded cereal biscuit having a shelf stable plurality of textures comprising:
   (a) a filling
   (b) a plurality of shredded cereal layers providing a region of dense texture enrobing said filling,
   (c) a plurality of shredded cereal layers providing a region of light texture enrobing said region of dense texture, each of the layers having a plurality of generally parallel longitudinal strands and a plurality of crosshatchings generally perpendicular to said strands, said crosshatchings and said longitudinal strands forming an integral net-like sheet, the number of crosshatchings of the integral net-like sheets which provide the region of dense texture being greater than the number of crosshatchings of the net-like sheets which provide the region of light texture, substantial penetration of the filling through the net-like sheets being prevented by the crosshatchings of the net-like sheets of the region of dense texture.

2. A cereal biscuit as claimed in claim 1 wherein a sugar is deposited between said filling and said layers providing the region of dense texture to inhibit moisture migration from the filling to the layers.

3. A cereal biscuit as claimed in claim 2 wherein a plurality of shredded cereal layers providing a second region of dense texture enrobes said layers providing the region of light texture.

4. A cereal biscuit as claimed in claim 2 wherein the water activity of the filled biscuit is less than about 0.6, and the average moisture content of the filled biscuit is from about 6 percent by weight to about 12 percent by weight.

5. A cereal biscuit as claimed in claim 3 wherein the amount of filling is at least about 15 percent by weight based upon the total weight of the filled shredded biscuit.

6. A cereal biscuit as claimed in claim 5 wherein the amount of said deposited sugar is from about 4 percent by weight to about 10% by weight, based upon the total weight of the filled shredded biscuit.

7. A cereal biscuit as claimed in claim 6 wherein said deposited sugar is granulated brown sugar.

8. A cereal biscuit as claimed in claim 6 wherein the filling is a dehydrated fruit paste filling.

9. A cereal biscuit as claimed in claim 8 wherein the filling is a raisin paste filling comprising ground raisins and glycerin.

10. A cereal biscuit as claimed in claim 8 wherein the filling is an apple filling.

11. A cereal biscuit as claimed in claim 8 wherein the filling is a strawberry filling.

12. A cereal biscuit as claimed in claim 5 wherein the number of crosshatchings in each of the layers forming the region of light texture is less than about 50 percent of the number of crosshatchings of each of said layers forming the region of dense texture, and at least 30 percent of the total number of layers provide a light texture.

13. A cereal biscuit as claimed in claim 1 wherein the filling is a meat filling or cheese filling.

14. A ready-to-eat paste-filled shredded cereal biscuit having a shelf stable plurality of textures comprising:
    (a) a fruit-paste filling comprising dehydrated fruit and glycerin,
    (b) a plurality of shredded cereal layers providing a region of dense texture enrobing said filling.
    (c) a layer of a sugar deposited between at least a portion of said filling and said layers providing the region of dense texture to inhibit moisture migration from said filling to said layers,
    (d) a plurality of shredded cereal layers providing a region of light texture enrobing said region of dense texture, and
    (e) a plurality of shredded cereal layers providing a second region of dense texture enrobing said layers providing the region of light texture.

15. A shelf-stable paste-filled ready-to-eat shredded cereal biscuit produced by a continuous process comprising the steps of:
    (a) continuously laminating a first plurality of shredded cereal dough layers, each of the layers having a plurality of generally parallel longitudinal strands and a plurality of crosshatchings generally perpendicular to said strands, said crosshatchings and said longitudinal strands forming an integral net-like sheet,
    (b) continuously depositing at least one extrudate rope filling upon said first plurality of shredded layers, each extrudate rope being deposited generally parallel to said longitudinal strands,
    (c) continuously laminating a second plurality of shredded cereal dough layers upon said at least one extrudate rope to obtain a filled laminate, the number of crosshatchings of the integral net-like sheets adjacent to the at least one extrudate rope filling being greater than the number of crosshatchings on the next net-like sheet further removed from the filling, the crosshatchings of the net-like sheets preventing substantial penetration of the filling through said adjacent net-like sheets, said further removed net-like sheets providing a region of light texture and said adjacent net-like sheets providing regions of dense texture in the filled biscuit,
    (d) cutting the filled laminate, and
    (e) baking the cut filled laminate.

16. A shredded cereal biscuit in accordance with claim 15 wherein a sugar is continuously deposited substantially uniformly across said first plurality of shredded cereal dough layers prior to deposition of said at least one extrudate rope filling to inhibit moisture migration from the baked filling to the baked net-like sheets.

17. A shredded cereal biscuit in accordance with claim 15 wherein a sugar is continuously deposited substantially uniformly across said at least one extrudate rope filling prior to the lamination of said second plurality of shredded cereal dough layers to inhibit moisture migration from the baked filling to the baked net-like sheets.

18. A shredded cereal biscuit in accordance with claim 16 wherein the crosshatchings of the adjacent net-like sheets prevent substantial passage of said sugar through said adjacent net-like sheets.

19. A shredded cereal biscuit in accordance with claim 15 wherein the cutting of the filled laminate is first generally transverse to said longitudinal strands and then generally parallel to said longitudinal strands, the parallel cuts being made between adjacent extrudate filling ropes.

20. A shredded cereal biscuit in accordance with claim 15 wherein said filling is a fruit paste filling, a meat filling or a cheese filling.

21. A shredded cereal biscuit in accordance with claim 14 wherein said filling is a fruit paste filling comprising dehydrated fruit and glycerin, said filling having a water content of at least about twelve percent by weight of said extrudate rope, and wherein the water activity of said biscuit is less than about 0.6.

22. A shredded cereal biscuit in accordance with claim 21 wherein the amount of filling in said biscuit is at least about fifteen percent by weight based upon the weight of the final product.

23. A shredded cereal biscuit in accordance with claim 21 wherein said dehydrated fruit comprises ground raisins.

24. A shredded cereal biscuit in accordance with claim 16 wherein said sugar is deposited in an amount to provide from about four percent to about ten percent by weight of sugar, based upon the total weight of the filled biscuit.

* * * * *